United States Patent [19] [11] Patent Number: 4,545,203
Deininger et al. [45] Date of Patent: Oct. 8, 1985

[54] HYDROSTATIC DRIVE UNITS

[75] Inventors: Horst Deininger, Hoerstein-Alzenau; Burkhard Stuermer, Aschaffenburg, both of Fed. Rep. of Germany

[73] Assignee: Linde Aktiengesellschaft, Wiesbaden, Fed. Rep. of Germany

[21] Appl. No.: 517,917

[22] Filed: Jul. 28, 1983

[30] Foreign Application Priority Data

Jul. 29, 1982 [DE] Fed. Rep. of Germany ....... 3228360

[51] Int. Cl.⁴ ............................................ F15B 15/18
[52] U.S. Cl. ...................................... 60/468; 60/494; 137/38; 137/46; 180/307
[58] Field of Search ..................... 60/468, 494; 137/38, 137/46; 180/307, 308; 91/437, 452

[56] References Cited

U.S. PATENT DOCUMENTS 3,027,776  4/1962  Snyder ................................. 137/46
3,740,950  6/1973  Polaski ................................ 60/468

FOREIGN PATENT DOCUMENTS 1119026 12/1961  Fed. Rep. of Germany ........ 137/38

Primary Examiner—Robert E. Garrett
Assistant Examiner—John M. Husar
Attorney, Agent, or Firm—Buell, Ziesenheim, Beck & Alstadt

[57] ABSTRACT

An hydrostatic drive unit for driving a motor vehicle is provided including a pump, a hydraulic motor, connecting means between said pump and motor, a branch line connected to the connecting means, a shut-off means located in said connecting means, measuring means in said shut-off means for measuring the horizontal forces arising in the direction of the longitudinal axis of the vehicle, said shut-off means acting on the hydrostatic drive unit, said measuring means including a mass capable of being displaced in the direction of the longitudinal axis of the vehicle against a forcible stop, resilient means acting on said mass to position the same normally in a center position capable of movement in two directions on the longitudinal axis of the vehicle and in working connection with the shut-off element whereby during the exertion of force upon the forcible stop, said mass acts directly or indirectly on said shut-off element to control fluid flow in said connecting means.

19 Claims, 3 Drawing Figures

HYDROSTATIC DRIVE UNITS

This invention relates to hydrostatic drive units and particularly to a hydrostatic drive unit for driving a motor vehicle, in which the drive unit consists of a pump and at least one hydraulic motor connected with the pump through at least one line, in which case a branch line is connected to this line and a shutoff device is located in this branch line, where a mechanism that measures the horizontal forces that arise in a mass in the direction of the longitudinal axis of the vehicle acts on the hydrostatic drive unit, i.e., furnishes signals that are dependent on the magnitude of the horizontal forces and act on an element at the hydrostatic drive unit in order to limit the acceleration attainable by the drive unit.

In a familiar drive unit of this type a mechanism is provided by which the variable control rate of the drive unit can be controlled, and in this manner the acceleration or deceleration attainable by means of the drive unit. A measuring device is provided, by which not only the magnitude of the load assumed, but also the horizontal forces arising on it in the direction of the longitudinal axis of the vehicle are measured, in which case the measuring device furnishes a signal to the element of the drive system, which influences the adjusting function for the hydrostatic drive unit (DE-OS No. 22 08 097).

The use of inertia elements, i.e., slow-moving masses, is also known; they serve to control the valve-like devices as a reaction to a decrease in the speed of the vehicle. In any case, this is known to date only in connection with brakes (DE-OS No. 30 19 630 and EP-A No. 00 13 841) or with stabilizers for absorbing the centrigual force on the springing in negotiating curves.

Hydrostatically driven vehicles, e.g., industrial trucks, utilize the hydrostatic drive unit as operating brakes, in which the pump of the drive unit is set to a smaller stroke volume per revolution and thus a smaller delivery stream at a given r.p.m. for decreasing the travel speed. It is disadvantageous here that the effects on the braking retardation, such as the temperature of the working medium in the drive unit, supplementary braking by means of a friction brake, rolling resistances, and whether the vehicle is loaded or unloaded and thus the drive axle is loaded or unloaded, are not taken into account. The braking energy is conveyed here via the drive unit into the internal-combustion engine driving the vehicle, whose r.p.m. is thus run up, such that annoying noise, unnecessary wear, and generally unnecessary fuel consumption result. On the other hand, there is interest in limiting the deceleration possible in many vehicles, especially in fork lifts, which have taken up a load in front of the front axle, in which case this limitation of the possible deceleration must be correctly adjustable so that a deceleration can be attained, whose attainment is prescribed for the acceptance of such vehicles.

The invention proposes a mechanism by which the deceleration of the vehicle can be restricted within narrow tolerances, independently of the state of loading and independently of the setting of the pump of the hydrostatic drive unit and its variation.

This problem is resolved in accordance with the invention in that the mass collaborating with the measuring device is supported so that it can be displaced in the direction of the longitudinal axis of the vehicle against the force of a spring, in which case it acts on the shutoff device during displacement against the force of the spring due to a deceleration when a predetermined minimum deceleration is reached, i.e., after a prescribed path is traversed or an initial stressing force of the spring is overcome, and opens it in a throttling manner, such that the pressure fluid is metered in a throttled manner from the line through which the pressure fluid is conveyed from the hydraulic motor, which now operates as a pump, to the pump, which now operates as a hydraulic motor, that is, the stream of energy flowing in the braking state from the unit provided as a hydraulic motor to the unit provided as a pump is divided into a stream that flows to the unit provided as a pump and drives the internal-combustion engine, and a stream in which energy is destroyed by the throttling. A high acceleration of the internal-combustion engine is thus avoided or at least limited and a reduction in the travel noise is thus achieved.

It is assumed that the desired braking retardation is less than the maximum desired acceleration, a device is then provided for modifying the action of the measuring mechanism on the shutoff device during acceleration as compared with the state during deceleration in that the initial tension of the spring is modified or an additional shutoff valve is installed in the branch line and it is controlled by the actuator controlling the travel state and connects the shutoff device with the line between pump and motor only in the braking state. If the hydrostatic drive unit is regulated by means of a control pressure, this additional element can be regulated, e.g., by the control pressure. In a hydrostatic drive unit operating in closed circuit, in which the pump is connected with the motor through two lines, the shutoff device can be located between these two lines or a reversing slide that connects the line carrying the higher pressure with the shutoff device can be provided. In this case it is also possible to design the reversing slide so that it connects the line carrying the higher pressure with the shutoff device only in the braking state. By making the action of the measuring mechanism on the shutoff device dependent on whether acceleration or deceleration is present, it is possible to attain a greater acceleration with the drive unit than the defined maximum deceleration without the action of the mechanism provided according to the invention. If the mechanism were to engage during acceleration, a portion of the drive power would be destroyed in the restrictor in the shutoff device during an operating state in which the full drive power is required.

It is also possible to convey the stream flowing out through the shutoff device to the pressureless reservoir. If such a system is used in a hydrostatic drive unit operating in closed circuit, care must be taken so that the delivery pump can feed a stream into the circuit that is greater than the maximum stream flowing out through the shutoff device.

It is therefore more expedient if the shutoff device is located between the two lines of the closed circuit during such operation, or the system is operated in open circuit if the shutoff device is connected to a pressureless reservoir.

On the other hand, a pay-out behavior can be achieved by the defined deceleration that is similar to the characteristics of a vehicle with drive through a hydrodynamic converter. In most vehicles the acceleration attainable is definitely smaller due to the installed power than the deceleration, whose attainability is prescribed.

In an additional expedient embodiment it is provided that the operator can arbitrarily influence the shutoff device so that a free run-out can be arbitrarily achieved or the connection between hydraulic pump and hydraulic motor can for other reasons be completely interrupted, e.g., for towing. It can also be expedient if the shutoff element can be arbitrarily brought into a position in which it throttles in an arbitrarily adjustable degree in order to restrict the torque furnished by the hydraulic motor and thus the propelling force of the vehicle, e.g., in order to be able to limit the propelling force if the vehicle is travelling on a path with reduced road traction, such as wet pavement or gravel, possibly also to be able to restrict the braking retardation if such a lesser maximum deceleration is admissible with respect to the other requirements imposed on the vehicle.

The shutoff device can be a slide valve whose slide acts as the mass that can be displaced during deceleration. Familiar mechanisms can be used here to prevent static friction, e.g., the generation of minor vibrations, or the continuous rotation of the valve piston. Finally, the inert mass can also act on an electric sensor, which acts through an electric-electronic element on the shutoff device. It is particularly advantageous if the hydrostatic drive unit is provided in the usual manner with relief-valve jets and the latter or one or the latter is provided as the shutoff device according to the invention, in which case it is modified at the prescribed engagement of the limiting pressure, e.g., by changing the initial tension of the spring, so that the throttlihg action begins when the anticipated deceleration is achieved.

The inert mass, e.g., the slide piston, can be supported against a spring on both sides, such that the action according to the invention is effective in both travel directions during deceleration. If desired, the two springs can have different characterisitcs or a different initial tension in order to be able to set different maximum decelerations in the two directions of travel. If the mechanism is to act in only one direction of travel, only one spring is required.

If the valve piston of the shutoff device is directly designed as the inert mass that can be displaced against the force of a spring, this valve piston must be relatively heavy with respect to the practical workability of the spring and the valve. This also induces a great friction in the borehole in which the slide can move and may necessitate measures for reducing the friction. In any case, practically feasible sizes of the valve piston will always furnish relatively slight controlling forces and thus necessitate only weak springs, which is difficult to produce with a precise characteristic.

In order to avoid this disadvantage, it is provided according to another expedient step of the invention that the mass is supported on a lever, which is supported against the spring and which acts on a control arrangement that regulates the shutoff device so that a power amplification is achieved through this control arrangement. A power amplification is achieved on the one hand by the lever action of the mass on the lever; on the other hand, a power amplification can be achieved by the control arrangement so that the shutoff device can be equipped with powerful springs of conventional size and it still responds sensitively to the acceleration forces.

As an expedient embodiment it is provided that the lever acts on a baffle plate system, by which different pressures are produced in two control lines, in which case the shutoff device is a hydraulically actuatable one with two control-pressure chambers, where the two control lines in which the pressure is generated through the baffle plate system are connected to the two control-pressure chambers of the shutoff device. For actuating the shutoff device there is a difference between the two control pressures present in the two control lines available in this embodiment, in which case a pressure difference can be attained in the conventional baffle plate system that is quite sufficient to actuate normal valve slides in a reliable and sensitive manner.

The mass fastened to the lever produces a force during both acceleration and deceleration of the vehicle. If the limiting action through opening the shutoff device is to be effective either only during acceleration or, preferably, only during deceleration and if the vehicle can travel as usual in both directions of travel, the additional control switching arrangement used must act so that the effect induced by the inert mass acts on the shutoff device only during the desired phase, acceleration or, preferably, deceleration.

Control switching arrangements in drives for both directions of rotation or in vehicles in both travel directions, which are to exert a definite function only during deceleration, e.g., are to apply an auxiliary force-controlled brake only during braking or are to effect the storage of hydraulic energy in a pressure storage system only during braking, are known in themselves (DE-OS No. 21 39 584). Such familiar systems can also be provided in the present case for controlling the control arrangement acting on the shutoff device.

However, the control switching arrangement designed in accordance with another particular step of the invention is particularly advantageous. It can also be used for the other familiar applications as those mentioned above and it can be used for hydrostatic drive units controlled by a control pressure and operating in closed circuit, in which case, according to this additional embodiment of the invention, a hydraulically controlled two-position multiway acting valve is provided, whose two control-pressure chambers are each connected with one line of the closed circuit so that, depending on which of the two lines of the closed circuit is loaded with the higher pressure, this two-position multiway valve assumes a definite switching position, where a control-pressure line leading to the operating cylinder of the hydraulic pump of the drive unit is connected to each of the two connections of this multiway valve and where a line leading to a control-pressure chamber of a hydraulically actuated additional device is connected to the outlet connection of this two-position multiway valve. Since only one of the two control-pressure lines is acted upon by pressure, a pressure will be thus furnished through the two-position multiway valve on the control-pressure chamber of this additional device only if one of two possible combinations arises relative to the higher pressure in one of the two control-pressure lines and the higher pressure in one of the two lines of the closed circuit of the drive unit. A short-circuiting slide, supported against a spring and switched between the two control lines departing from the baffle plate element, is the preferred design of this additional device, so that if the drive unit conveys energy from the hydraulic pump to the hydraulic motor such that acceleration is effected in an optional travel direction, this short-circuiting slide connects the two control-pressure lines and thus the shutoff device remains unactuated, while if the vehicle is braked through the drive unit in one of the two possible travel directions, this additional short-circuiting slide is closed and thus the pressure difference in the two control lines acts on the shutoff device.

The above statements pertain to the embodiments predominantly used hitherto, in which the hydrostatic drive unit is controlled by an auxiliary hydraulic force. Of course, the invention is also analogously applicable in a hydrostatic drive unit that is controlled—as in increasingly occurring—by means of an auxiliary electric force and by means of auxiliary electric boost control signals. It is always decisive here that two signals are provided, one for each delivery direction of the drive unit pump and a singal dependent on the pressure carried in this line comes from each of the two lines of the closed circuit of the drive unit, in which case it is essential for the control switching arrangement that the assignment of the two signals determining the swing-out position of the pump to the two signals dependent on the pressure in the drive unit line be verified and a signal be switched through to an additional device, provided only the signal for the delivery direction of the pump corresponds to the signal in the drive unit line assigned to this delivery direction, independently of whether an electric, hydraulic, pneumatic, or other auxiliary power signal is involved.

The invention and its mode of action will be better understood from the following description and by reference to two examples of its embodiment set out in the accompanying drawings in which.

Figure 1:
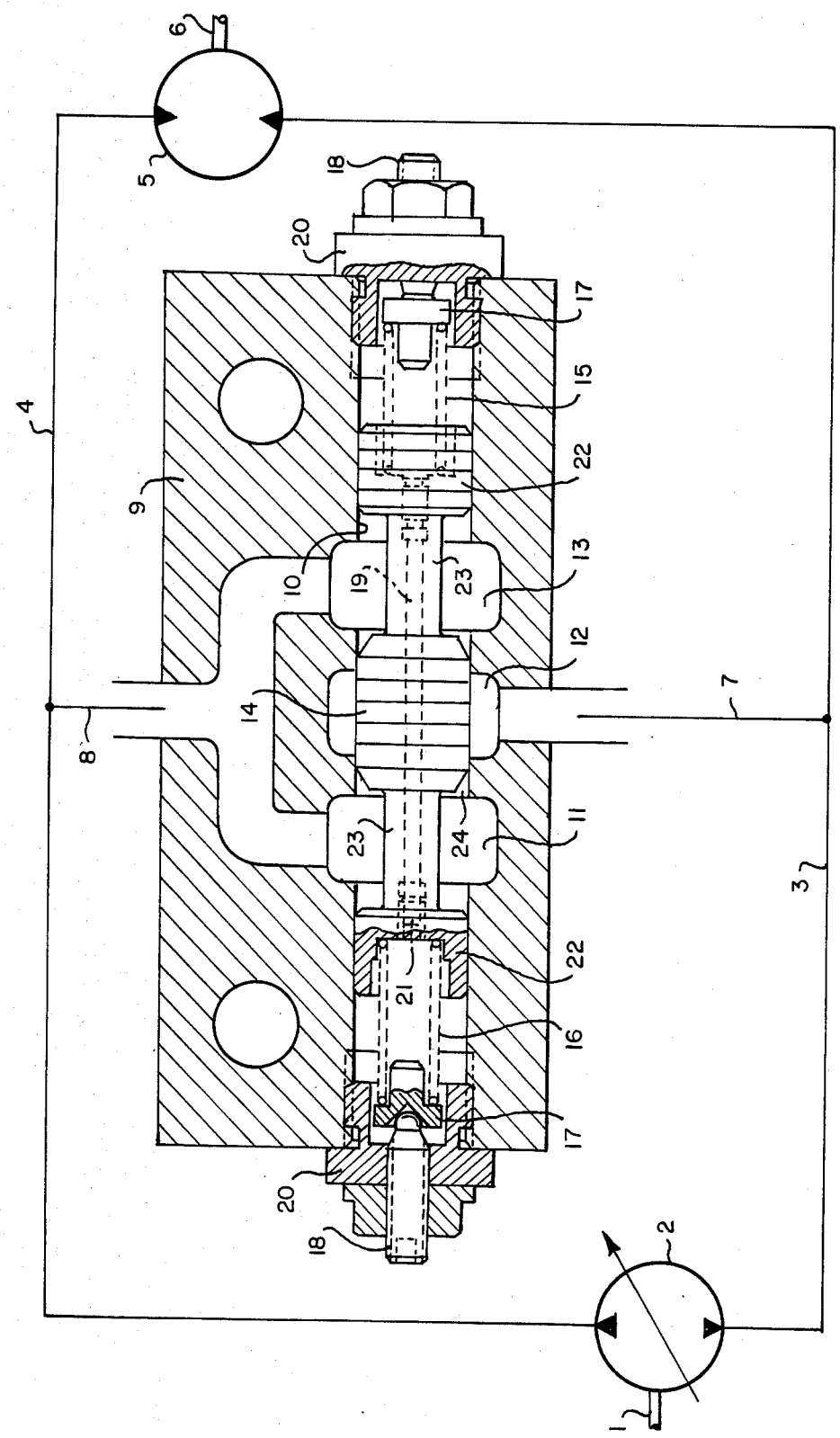
FIG. 1 shows an embodiment in which the inert mass is designed directly as the valve piston of a shutoff device valve.

The invention and its mechanism of action are more fully explained in the following description of the one embodiment set out in FIG. 1.

The adjustable hydralic pump 2 of the hydrostatic drive unit is driven by an internal-combustion engine (not shown) through the shaft 1. The pump 2 is connected through the two lines 3 and 4 with the hydraulic motor 5 whose output shaft 6 is in active connection with the drive wheels of the vehicle (not shown).

A branch line 7 is connected to the line 3 and a branch line 8 is connected to the line 4. Both lines 7 and 8 lead to a shutoff device 9, which is incorporated into the vehicle (not shown) such that the longitudinal borehole 10 lies precisely in the longitudinal axis of the vehicle. The longitudinal borehole 10 is provided with three intersecting annular chambers 11, 12, and 13, where the annular chambers 11 and 13 are connected with line 8 and the annular chamber 12 is connected with line 7.

A slide 14, designed as an inert mass, is capable of sliding in the longitudinal borehole 10 and it is tensioned between two springs 15 and 16. Each of the two springs 15 and 16 is supported against a spring plate 17, whose position is adjustable with a threaded bolt 18 for setting the pretension of the spring. A longitudinal borehole 19 is provided in the valve piston 14 and it connects the chambers in front of the two faces of the valve piston 14 with each other so that the valve piston 14 is not hindered in the displacement movement by the fluid enclosed in the spaces in front of its end faces, each of which is closed off by a plug 20. A restrictor 21 is incorporated in the longitudinal borehole 19; it restricts the rate of displacement movement.

The valve piston 14 consists of a central section and two end sections 22, in which case the central section and the two end sections 22 have the same diameter, corresponding to the diameter of the borehole 10, so that no longitudinal force is exerted on the valve piston 14 by the pressure present in the annular chambers 11 and 13. The two end sections 22 of the valve piston 14 are connected with this central section through a narrowed section 23.

In the normal operating state the valve piston 14 is in the position shown in the drawing, in which it shuts off the connection between the annular chamber 12 and the annular chambers 11 and 13. If the vehicle travels in the direction from spring 16 to spring 15 and it is then decelerated, an inertial force arises due to the retardation in the valve piston 14, displaces the valve piston 14 against the force of spring 15, and compresses the latter. A connection is thus produced at the edge 24 of the valve piston 14 between the annular space 12 and the inner space of borehole 10 and the annular space 11, so that working medium can flow from line 3 to line 4 or vice versa, depending on which of the two lines 3 and 4 is carrying the higher pressure. In this case, the stream at the edge 24 is throttled and energy is destroyed during this throttling. The greater the deceleration, the more the valve piston 14 is shifted in the said direction and the larger the cross section of free passage becomes at the edge 24. If deceleration takes place in the opposite direction, the opposite effect occurs.

According to the invention, the influence of the mass inertial force acting on the valve piston 14 is thus utilized during the braking process. Through the deceleration of the vehicle, the force due to inertia or gravity $F = m \cdot b$, where F is the force, m is the mass of the valve piston 14 in kg, and b is the braking retardation in meters per second to the second power, acts on the valve piston 14 which is displaceably supported in the longitudinal direction of the vehicle. This inertial force F shifts the valve piston 14 until the tensional force of the spring 15 (or spring 16 when the displacement takes place in the opposite direction) due to the shift equals the inertial force F and a state of equilibrium is thus produced. If the predetermined braking retardation is exceeded, the valve piston 14 opens the connection between the annular chamber 12 and one of the annular chambers 11 or 13 so that a self-regulating throttle cross section results, at which braking energy is converted to heat. Due to the symmetric construction, the shutoff device 9 operates in both directions of travel.

Figure 2:
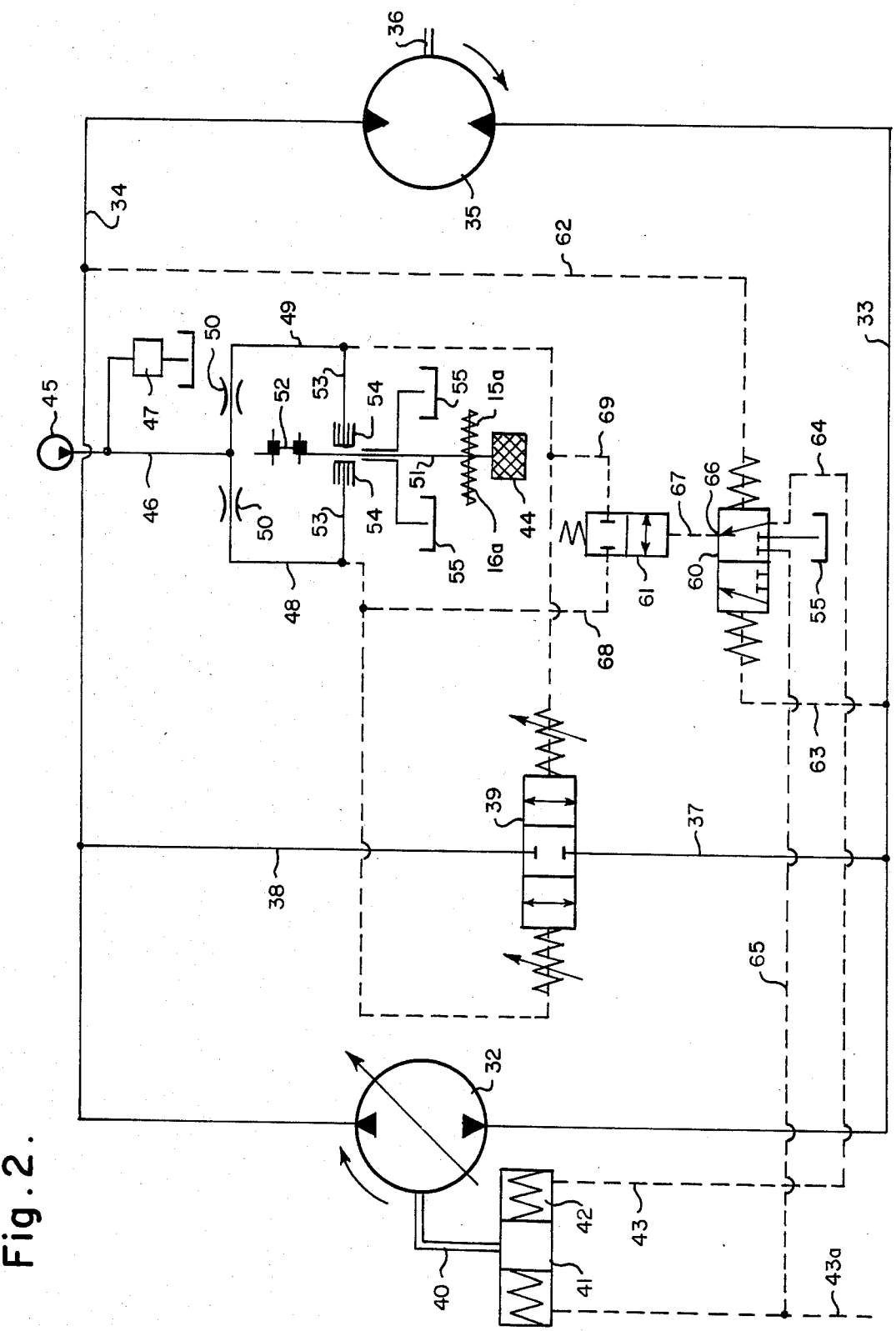
FIG. 2 shows an embodiment with a hydraulic control for the shutoff device.
Figure 3:
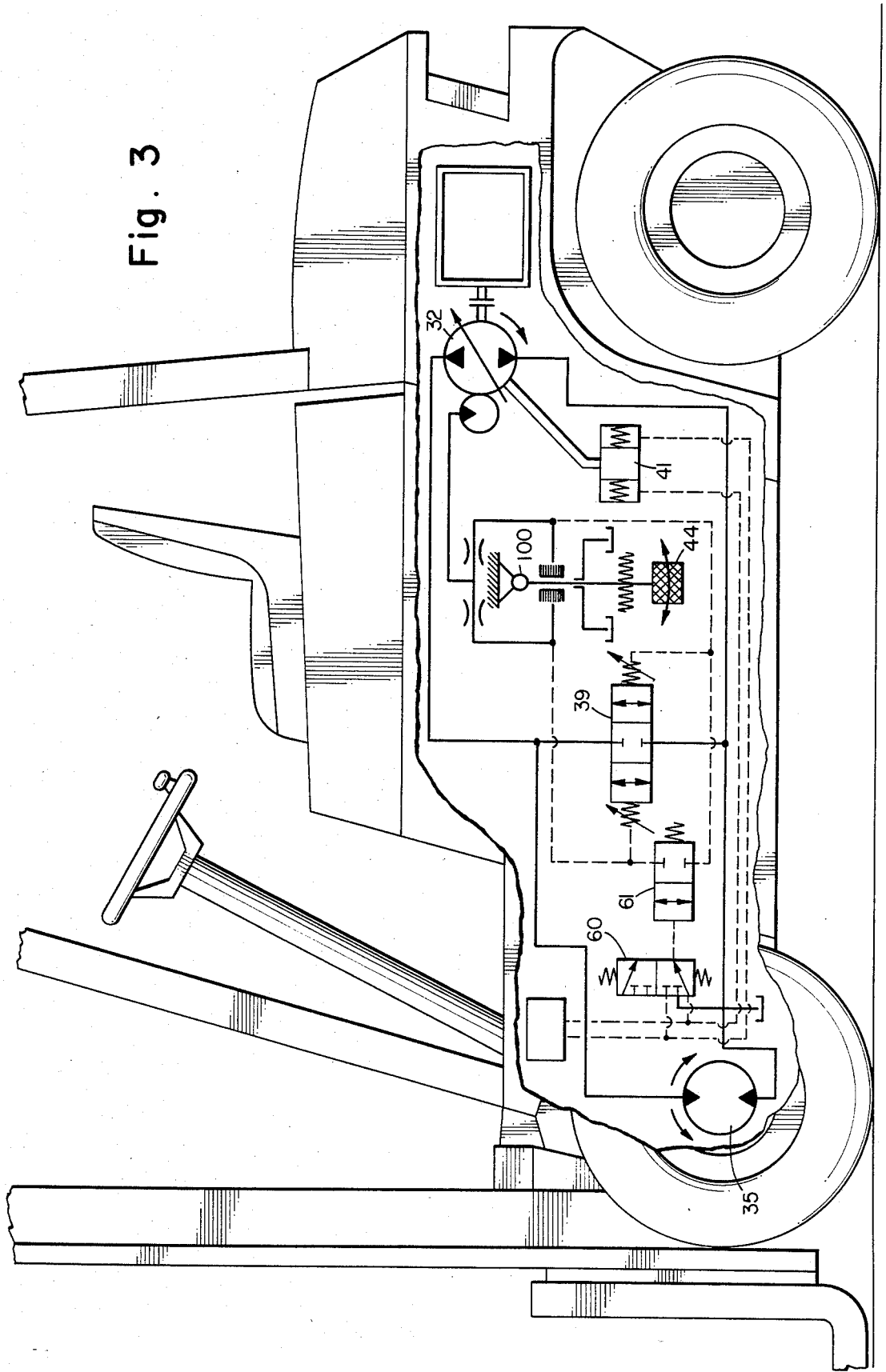

In the embodiment according to FIG. 2, the hydrostatic drive unit consists of an adjustable hydraulic pump 32 that is connected through two lines 33 and 34 in closed circuit with the hydraulic motor 35, whose shaft 36 is connected with the drive wheels (not shown) of the vehicle. A branch line 37 is connected to line 33 and a branch line 38 is connected to line 34, where the shutoff device, designed as a hydraulically actuated three-position/two-connection valve 39, is installed between the two branch lines 37 and 38.

The final control element 40 of the hydraulic pump 32 is connected (directly or indirectly through a servo power control arrangement) with the servo piston 41, which is tensioned between two springs in an operating cylinder 42, in which case a control-pressure line 43 is connected to the one pressure chamber of the operating cylinder 42 and a control-pressure line 43a is connected to the other control pressure chamber of the operating cylinder 42.

A delivery line 46, which is secured by a relief valve jet 47, is connected with an auxiliary pump 45. The delivery line 46 brances into two control lines 48 and 49, in each of which a restrictor 50 is located (the two restrictors are identical).

The inert mass 44 sensing the deceleration is fastened to a lever 51, which is fastened at its pivot point 52 on the frame of the vehicle or some other part of the vehicle that is solidly connected to the frame, so that the lever can swing only in the longitudinal direction of the vehicle. The lever 51 is supported between two springs 15a and 16a, which in turn are supported against the same component on which the lever 51 is supported. A branch line 53 departs from each of the two lines 48 and 49 and it leads each to a baffle plate nozzle 54. These baffle plate nozzles 54 are identical. The pressure medium flowing off from the baffle plate nozzles 54 flows into the pressureless reservoir 55.

The line 48 is connected to the one control-pressure chamber of the multiway valve 39 and the line 49 is connected to the second control-pressure chamber of the multiway valve 39.

The mechanism of action is as follows: if an accelerating or decelerating force acts on the inert mass 44, the lever 51 is swung against the force of spring 15a or against the force of spring 16a, depending on the direction of force action, as a result of this force. The gap between the baffle plate formed at the lever 51 and one of the two baffle plate nozzles 54 thus becomes smaller than the gap in front of the other baffle plate nozzles 54, with the result that a higher pressure is built up in one of the two lines 48 or 49, while the pressure in the other one of the two lines 49 or 48 is decreased as a result of the larger gap at the baffle plate nozzle 54. Consequently, when the difference between the pressures in the two lines 48 and 49 is sufficiently great, the multiway valve 39 is displaced into one of the two switching positions, in which it connects the two branch lines 37 and 38 and thus the two lines 33 and 34 of the hydrostatic drive unit with each other in a throttling manner.

The action of an inertial force on the inert mass 44 occurs during both acceleration and deceleration. In order to have the action occur on the shutoff device 39 only during deceleration, an additional control switching arrangement is provided; it consists of the two-position/four-connection multiway valve 60 and the short-circuiting additional shutoff valve 61.

The multiway valve 60 is a hydraulically actuated valve, one control-pressure chamber of which is connected through line 62 with the line 34 of the closed circuit and its second control-pressure chamber is connected through line 63 with the line 33 of the closed circuit of the hydraulic drive unit 32, 33, 34, 35. One of the connections of the multiway valve 60 is connected through the control-pressure line 64 to the control pressure line 43 and a second parallel connection is connected through the control-pressure line 65 to the control-pressure line 43a. Another connection of the multiway valve 60 leads to the pressureless reservoir 55. The outlet connection 66 of the multiway valve 60 is connected through the line 67 with the control-pressure chamber of the short-circuiting additional valve 61, whose slide is on the other hand displaceable against the force of a spring. Two lines 68 and 69 are connected to the two connections of this two-position/two-way valve 61, of which line 68 is connected with line 48 and line 69 with line 49.

In the state in which it is not acted upon by control pressure through line 67, the multiway valve 61 shuts off the two lines 68 and 69 and thus separates them from each other so that the additional control switching arrangement remains out of action. However, if the line 34 is acted upon by pressure and the control-pressure line 43 is simultaneously acted upon, the pressure carried in the control-pressure line 43 through the multiway valve 60 is conveyed through the line 64 into line 67 and thus into the control-pressure chamber of the multiway valve 61 so that the latter connects the two lines 68 and 69 with each other and thus produces a short circuit between the two lines 48 and 49, such that in this state, in which the vehicle is accelerated, the mechanism controlled by the mass 44 remains out of action. The same is true for the backward travel if the control-pressure line 43a is acted upon by control pressure and control pressure is simultaneously present in the control-pressure line 33, i.e., the vehicle is accelerated in the direction of backward travel. On the other hand, if the vehicle is decelerated in backward or forward travel, the control pressure is not conveyed through the multiway valve 60 to the control-pressure chamber of the multiway valve 61, and the two lines 48 and 49 thus remain separated from each other so that the mechanism 15a, 16a, 44, 54, 48, 49 acts on the multiway valve 39.

In another embodiment it would also be possible to connect the two control-pressure lines 43 and 43a to the two control-pressure chambers of the multiway valve 60 and correspondingly connect one of its connections to the drive unit line 33 and a second one to the drive unit line 34. This embodiment also lies within the scope of the invention, but it would have the disadvantage relative to construction costs that the multiway valve 60 must regulate a high pressure and the control-pressure chamber of valve 61 is acted upon by a high, sharply fluctuating pressure. It is essential that two pairs of lines be present, in which case only one of the two lines in each line pair carries high pressure in the operating state, where there are specific assignments in two specific operating states relative to which of the two lines carries high pressure and a switching operation would then occur only if the predetermined assignment takes place. In the present application of this embodiment, the lines of the one line pair are the control-pressure lines, through whose loading with pressure the setting and swing-out direction of the pump 32 of the drive unit are determined, and the two lines of the other line pair are the lines of the closed circuit of the drive unit, and the prescribed assignment is such that with the setting in which the pump 32 delivers in a specific direction of delivery, the higher pressure prevails in the line 33 or 34 into which the pump 32 delivers and thus energy is transfered from the pump 32 to the hydraulic motor 35.

In the foregoing specification we have set out certain preferred practices and embodiments of this invention, however, it will be understood that this invention may be otherwise embodied within the scope of the following claims.

We claim:

1. Hydrostatic drive unit for driving a motor vehicle comprising a pump, a hydraulic motor, connecting means including a pair of pressure fluid lines between said pump and motor, a branch line connected between the pressure fluid lines of the connecting means, a shut-off means located in said branch line, measuring means in said shut-off means for measuring the horizontal forces arising in the direction of the longitudinal axis of the vehicle, said shut-off means acting on the hydrostatic drive unit, said measuring means including a mass capable of being displaced in the direction of the longitudinal axis of the vehicle against a forcible stop, resilient means acting on said mass to position the same normally in a closed center position preventing flow through the branch line, said means being capable of movement in two directions from the center position on the longitudinal axis of the vehicle and in working connection with the shut-off element whereby during the exertion of force upon the forcible stop said mass acts on said shut-off element to control fluid flow in said connecting means through said branch line by permitting increased flow proportioned to increased force on the shut-off element.

2. A hydrostatic drive unit as claimed in claim 1 wherein the resilient means are opposing springs.

3. Hydrostatic drive unit operating in closed circuit according to claim 1, wherein the shut-off element is located in a branch line between the two fluid pressure lines making up the connecting means between the pump and hydraulic motor of the hydrostatic drive which lines are high and low pressure lines.

4. Drive unit according to one of the claims 1 or 2 or 3, characterized in that the mass is a valve piston of the shut-off means.

5. Drive unit according to claims 1 or 2 or 3, characterized in that the mass is centered between springs on opposite sides thereof.

6. Drive unit according to claim 5, characterized in that the two springs are different.

7. Drive unit according to claim 1, characterized in that the shut-off device is also arbitrarily actuatable.

8. Drive unit according to claim 1 with a relief-valve jet in the connecting means between pump and motor and wherein the shut-off means on which the mass acts is the relief-valve jet and the mass acts on an adjusting element of the relief-valve jet.

9. Drive unit according to claim 1, wherein the mass is fastened to a lever which is supported between opposing springs and which acts on a control means that regulates the shut-off device.

10. Drive unit according to claim 9, wherein the control means has a baffle plate system that induces different pressures in the two pressurized control lines and the shut-off means has two control pressure chambers and can be actuated by means of the pressure present in said two control-pressure chambers and said two pressurized control lines being connected to the two control-pressure chambers of the shut-off means.

11. Drive unit according to one of claims 1, or 2 characterized in that the mass is connected with a control power amplification system that regulates the shut-off means.

12. A drive unit as claimed in claim 9 or 10 having a gear pump which can be controlled through a control switching arrangement by means of an auxiliary boost control with regulation for each swing-out direction of the pump through a auxiliary boost control signal, including a two-position switch, two connections on said switch which can be controlled by one of two auxiliary boost control signals assigned to each swing-out position of the pump, a pressure signal transmitter element connected to the two-position switch located in each of the drive unit lines where the signals leaving this pressure signal transmitter element are also conveyed to the two-position switch and the signal leaving the latter acts on the input of an additional element.

13. Control switching arrangement according to claim 11, characterized in that the additional element extinguishes the signal of the control power amplification system in one switching position.

14. Control switching arrangement according to claim 12 for a drive unit controlled by means of a control pressure carried in two control-pressure lines assigned to one conveyance direction, characterized in that the two-position switch is a hydraulically controlled two-position multiway acting valve, the two control-pressure chambers of which are connected, each with a line of the closed cycle, in which case one of the control-pressure lines is connected to two connections of this multiway acting valve and where the additional element can be actuated by means of hydraulic control-pressure and where a line leading to the control-pressure chamber of the additional element is connected to the output connection of the multiway acting valve.

15. Control switching arrangement according to claim 14, wherein the additional element is a short-circuiting multiway acting value that is supported against a spring and is switched between the two lines that go out from the baffle plate system.

16. Control switching arrangement according to claim 12, characterized in that the auxiliary power is an electric current and the auxiliary boost control signal is an electric signal.

17. Drive unit according to claim 4 characterized in that the mass is connected with a control power amplification system that regulates the shut-off means.

18. Drive unit according to claim 5 characterized in that the mass is connected with a control power amplification system that regulates the shut-off means.

19. Drive unit according to claim 18 characterized in that the two springs are different.

* * * * *

UNITED STATES PATENT AND TRADEMARK OFFICE
CERTIFICATE OF CORRECTION

PATENT NO. : 4,545,203

DATED : October 8, 1985

INVENTOR(S) : Horst Deininger et al.

It is certified that error appears in the above-identified patent and that said Letters Patent is hereby corrected as shown below:

Column 3, line 32, "throttlihg" should read -- throttling --.

Signed and Sealed this

Twenty-first Day of January 1986

[SEAL]

Attest:

DONALD J. QUIGG

Attesting Officer

Commissioner of Patents and Trademarks